H. K. HARRIS.
ADVERTISING DEVICE.
APPLICATION FILED DEC. 19, 1914.

1,313,817.

Patented Aug. 19, 1919.
1 SHEETS—SHEET 1.

WITNESSES:

INVENTOR
Henry Kingsford Harris
BY
ATTORNEYS

H. K. HARRIS.
ADVERTISING DEVICE.
APPLICATION FILED DEC. 19, 1914.

1,313,817.

Patented Aug. 19, 1919.
7 SHEETS—SHEET 3.

WITNESSES:

INVENTOR
Henry Kingsford Harris
BY
ATTORNEYS

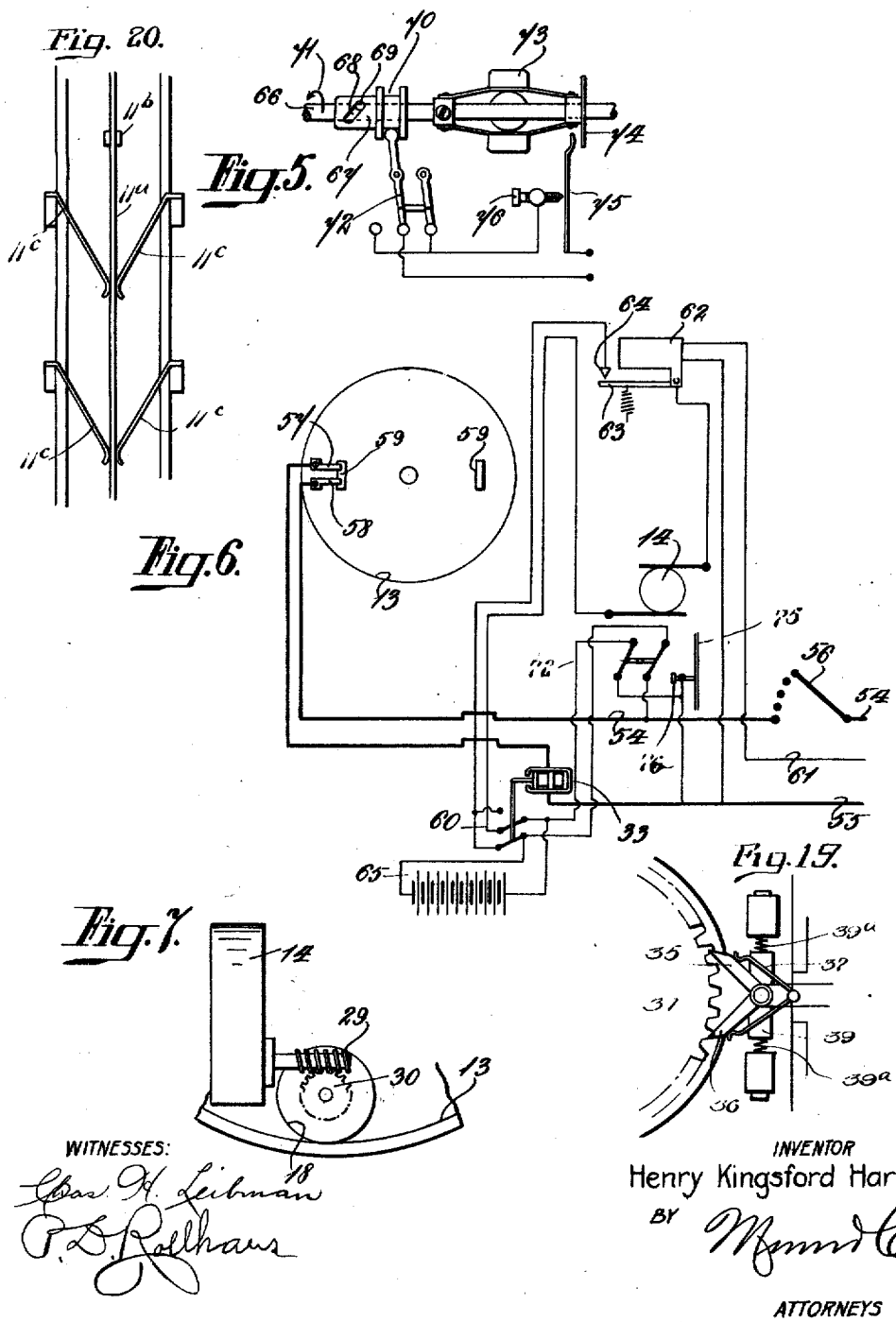

H. K. HARRIS.
ADVERTISING DEVICE.
APPLICATION FILED DEC. 19, 1914.

1,313,817.

Patented Aug. 19, 1919.

WITNESSES:

INVENTOR
Henry Kingsford Harris

ATTORNEYS

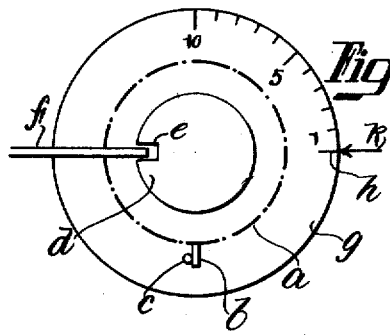
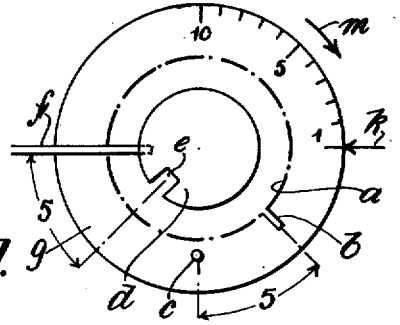
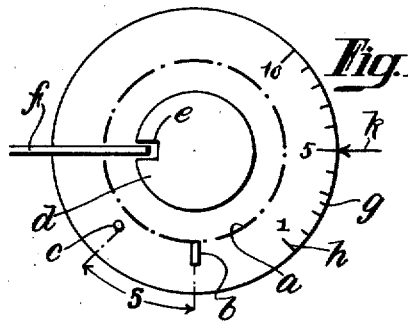
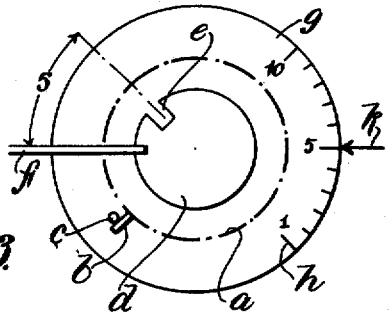
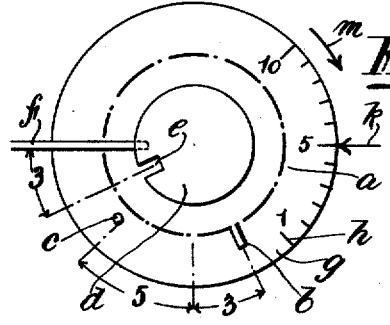
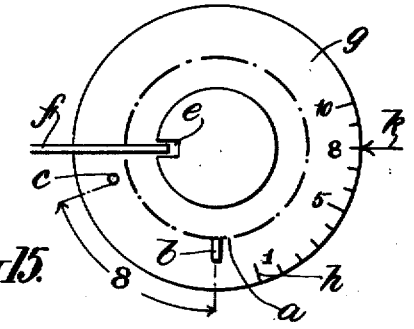
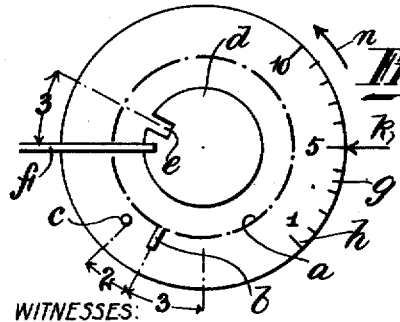
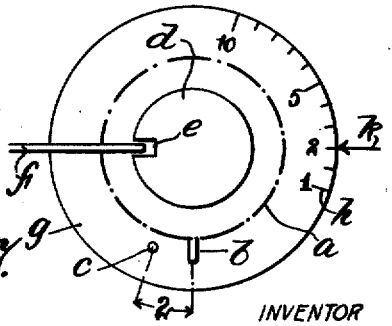

H. K. HARRIS.
ADVERTISING DEVICE.
APPLICATION FILED DEC. 19, 1914.
1,313,817.
Patented Aug. 19, 1919.
7 SHEETS—SHEET 7.
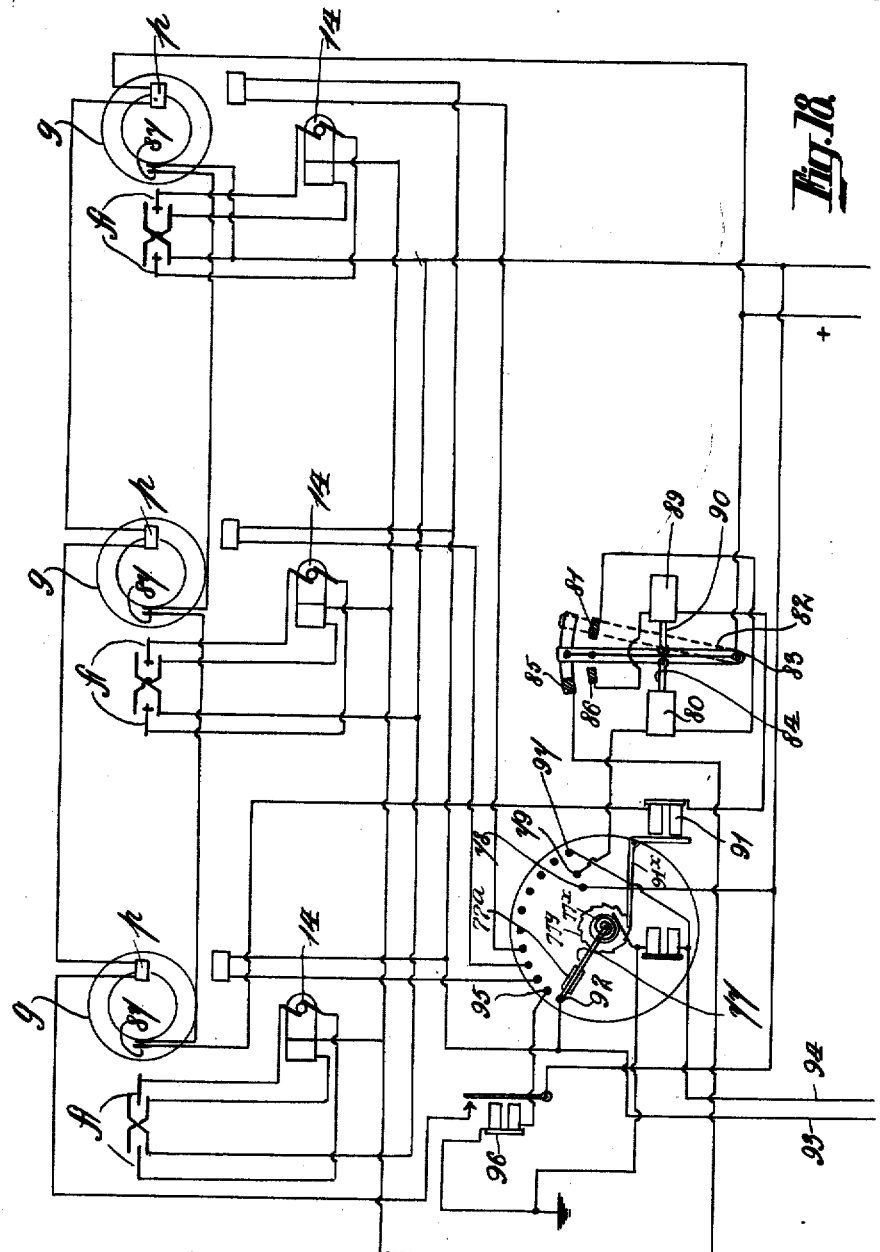
WITNESSES:
INVENTOR
Henry Kingsford Harris
BY
ATTORNEYS ial No. 878,064.

UNITED STATES PATENT OFFICE.

HENRY KINGSFORD HARRIS, OF LONDON, ENGLAND.

ADVERTISING DEVICE.

1,313,817.

Specification of Letters Patent.  Patented Aug. 19, 1919.

Application filed December 19, 1914. Serial No. 878,064.

*To all whom it may concern:*

Be it known that I, HENRY KINGSFORD HARRIS, a subject of the King of England, residing at 96 Victoria street, London, England, have invented certain new and useful Improvements in and Relating to Advertising Devices; and I do hereby declare the following to be a full, clear, and exact description of the invention, such as will enable others skilled in the art to which it appertains to make and use the same.

My invention relates to devices for making public announcements, exhibiting advertisements and for other purposes of a like nature, and refers to improvements upon that type of such devices in which selector mechanisms are provided which mechanisms control the movement of the exhibiting means and select the indications which are to be exhibited, the band or other equivalent means such as cards, plates, disks or the like carrying the indications being wound or moved backward or forward, the operation being controlled from a distant station preferably in conjunction with the control of the exhibiting units.

According to my present invention I provide a selector which not only determines the indication which is to be set but which also determines automatically (on the transmission to it of the required number of impulses to select the indication) the direction in which the band or its equivalent on the particular unit shall wind or be moved, the construction being preferably such that it is only requisite to wind or move through the number of steps which make up the difference between the fresh setting and the last.

In one form of carrying out the invention, the selector may comprise a wheel or other moving part, which is operated to determine the fresh indication it is desired to exhibit, and a counting wheel or other device which is set in position by the last setting. Each of these wheels or the like carries a stop which preferably may take the form of an electric contact but which might be mechanical. In one form the selector wheel makes one or more contacts during its setting which determine the direction of subsequent winding of the unit, and these contacts are made according to the movement of the setting wheel or the like in relation to that wheel or the like which has been set by the last indication. Further when the contacts on the two wheels or the like meet on the winding of the unit the movement is stopped at the desired indication, the selector wheel is then turned to zero, which may be effected by a spring wound by its previous movement ready for the next setting. The above devices may be used for the control of units driven by their own individual motors, or for the control of those driven collectively, with any form of gearing. The object of the invention is to bring the band or like device into position with the least possible displacement and preferably without its being necessary for the operator to have to take into consideration the previous setting. In one form when the units are driven by their own individual motors, the transmission to the drums may be by worm drive, but I may use any kind of driving mechanism or gearing, in some cases a differential gear, the wheels of which may be locked or released to bring about the required movements. The counting wheel that runs in synchronism with the band may in some cases be used to limit its motion in either direction.

The selector mechanism may be placed on an inclosed plate at the top of the machine and so constructed that it is readily accessible and easily removable without disturbing the rest of the unit, so that it can be replaced. The different units may be switched into circuit by a unit selector which in one form may be returned to zero by its spring when a circuit is closed on the completion of the setting of all the units, or it may be driven by its own motor.

And in order that my said invention may be better understood, I will now proceed to describe the same with reference to the drawings accompanying this specification in which:—

Fig. 5 shows a detail hereinafter referred to;

Fig. 6 shows diagram of connections;

Fig. 7 shows modified detail of construction;

Figs. 10 to 17 show diagrams illustrating the action of the selector shown at Figs. 8 and 9;

Fig. 18 shows diagram of connection for use with this last form of selector;

Figs. 19 and 20 are detailed views of modifications.

The same letters and numerals denote the same parts in all the views.

Figure 1:
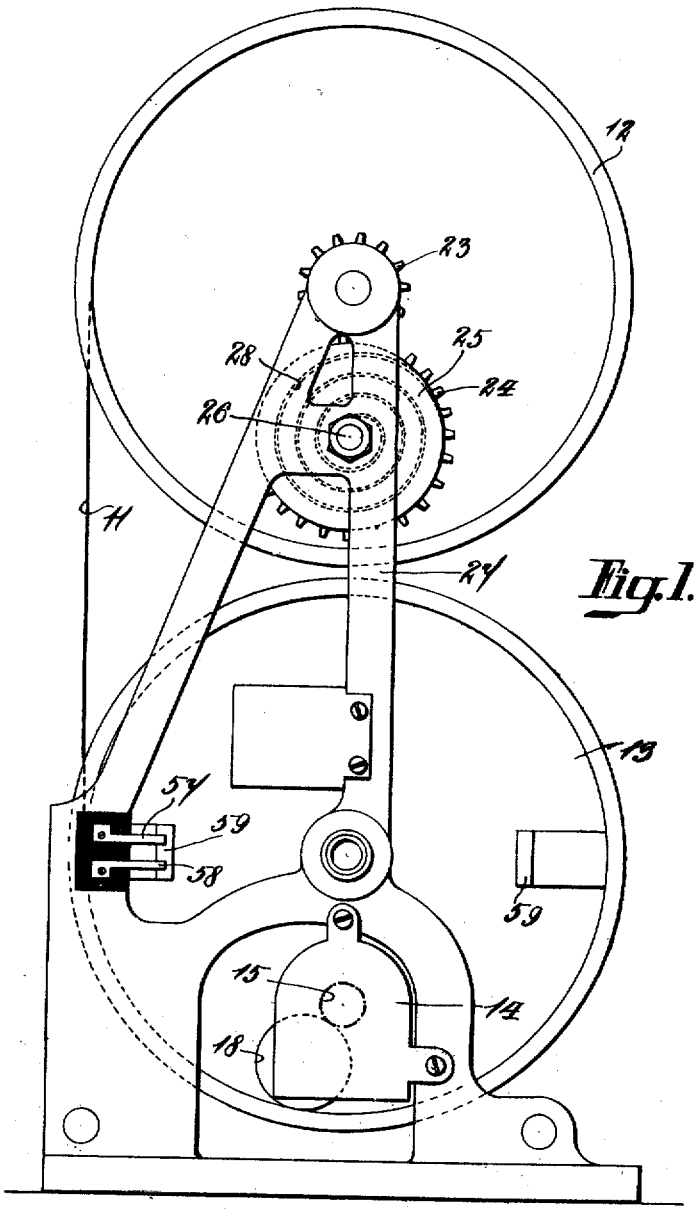
Figure 1 shows a side elevation of an advertising unit constituting a portion of my invention.

Referring to Figs. 1 to 7, 11 is the band carrying the letters, numerals or other devices. The band 11 is rolled between drums 12 and 13, the drum 13 being driven by a motor 14 at the required times. The motor imparts its movement to the drum 13 by a pinion 15 on the motor shaft running in gear with a wheel 16 the wheels 15 and 16 being located in an oil bath 17. On the spindle of the wheel 16 outside the casing is mounted a friction wheel 18 which runs in frictional contact with the interior of the drum 13. The motor 14 can be driven in either direction according to the direction of the current supplied thereto and thus causes the drum 13 and consequently the band 11 to be moved in either direction. The drum 13 is mounted by means of ball bearings 19 on a fixed hollow axle 20 provided with a lining 21 of insulating material the hollow insulated interior of this axle forming a conduit for the electric conductors. The drum 12 is mounted so as to turn about a fixed axle 22 and has attached thereto so as to rotate therewith a pinion 23 gearing with a wheel 24 attached to a spring barrel 25 rotating upon a fixed axle 26 fastened to the framework 27 which also carries the fixed axles of the drums 12 and 13. 28 is a spring in the interior of the spring barrel 25 one end of which is attached to the fixed axle 26 and the other end to the interior of the barrel 25.

When the motor 14 is turned in such a direction as to cause the band 11 to move downward it will be seen that the spring 28 is wound up and consequently when the motor turns in the opposite direction the spring 28 in unwinding winds the band 11 back on to the drum 12.

It will be understood however that the drums 12 and 13 can be geared together in any suitable way to effect the desired operation.

At Fig. 7 is shown another method of imparting rotation to the drum 13 from the motor 14. In this case the axle of the motor is furnished with a worm 29 gearing with a worm wheel 30 the shaft of which carries the friction wheel 18.

With this form of device any tendency the spring may have to cause the band 11 to move upward when not required is prevented.

Figure 3:
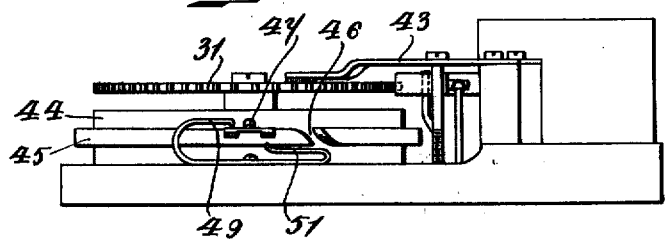
Fig. 3 shows in side elevation and Fig. 4 in plan a selector mechanism for use with an advertising unit such as that shown at Figs. 1 and 2.
Figure 4:
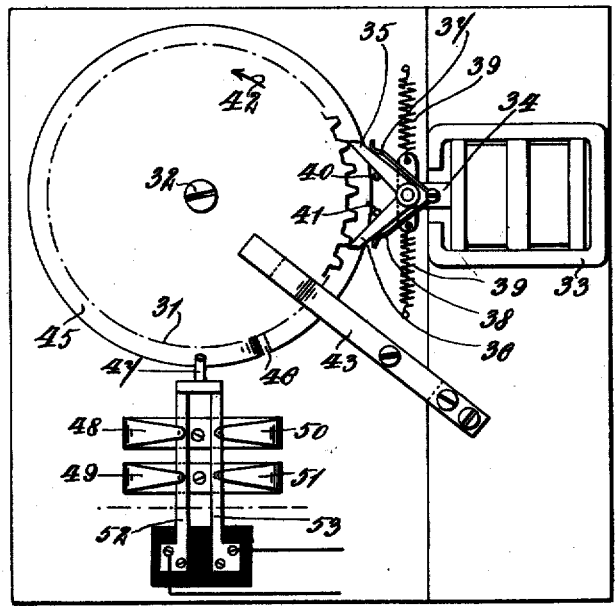

The direction in which the motor 14 is caused to run is controlled by the selector mechanism about to be described, more particularly with respect to Figs. 3 and 4. 31 is a toothed wheel forming the selector wheel mounted upon an axle 32, so that it can turn in either direction. 33 is a polarized magnet, the armature 34 of which is caused to move either up or down (with reference to Fig. 4) according to the direction of the current sent to the magnet. 35 and 36 are two independent pawls pivoted to the end of the armature 34 and kept pressed against the teeth of the wheel 31 by flat springs 37 and 38 carried by the armature 34. 39 are helical springs for keeping the armature 34 normally midway between the poles of the magnet 33. In place of springs 39 the ends of the armature may be located between two spring buffers 39ᵃ which hold it normally in the central position, as shown in Fig. 19. 40 and 41 are fixed stops against which the pawls 35 and 36 take. When a current of one polarity is sent to the magnet 33 it causes the armature 34 to be moved in one direction say for example (with reference to Fig. 4) in the upward direction. This action causes the pawl 36 to press against the pin 41 which thus forces the pawl 36 out of contact with the wheel 31, at the same time the pawl 35 being freed somewhat from the restraint of the pin 40 is forced into the teeth of the wheel 31 by the spring 37 and consequently the movement of the armature 34 causes the pawl 35 to move the wheel 31 through the distance of one tooth in the direction of the arrow 42. When the circuit is broken through the magnet 33 the parts return to the position shown at Fig. 4 the wheel 31 being prevented from turning back by the friction brake 43.

It will, therefore, be understood that the wheel 31 is turned through the same number of teeth in any desired direction as the number of electric impulses of one polarity sent to the magnet 33, and the position taken up by the wheel determines the direction in which the motor 14 is subsequently caused to run, as well as the time for which the motor runs, in the manner now to be described.

Fixed to the wheel 31 and beneath the same is a wheel 44 provided with a flange 45, which flange 45 has a portion 46 cut away, the walls of the cut away portion being sloped as shown at Fig. 3. 47 is an insulated projecting pin normally projecting into and being easily accommodated by the cut away portion 46. 48, 49, 50 and 51 are electric contacts, the contacts 48 and 49 coming on a higher level than the contacts 50 and 51, as shown at Fig. 3, 52 and 53 are two metallic springy arms, insulated from each other and connected at their free ends to the insulated pin 47. The spring arms 52 and 53 are adapted to take up one of three positions, the first being intermediate between the contacts 48, 49 and 50, 51, that is neither arm 52 nor 53 coming into electrical connection with any of the said contacts. This position is that in which the pin 47 rests within the cut away portion 46. When the wheel 31 turns in one direction it causes the pin 47 to ride up one of the inclined walls of the cut away portion 46. This causes the arm 52 to make electrical connection between the contacts 48 and 49, and it may be here remarked that these contacts are so connected to the electrical circuit of the apparatus that at the required time, when other contacts have been made, the motor 14 is caused to run in one direction. If, however, the pin 47 be caused to ride down the other sloping wall of the cut away portion 46—by the reverse setting of the selector—it causes the arm 53 to make electrical connection between the contacts 50 and 51, which are so connected to the electrical circuit that the motor 14 is subsequently caused to rotate in a direction opposite to that previously described.

Referring now to the parts already described with reference to the diagram, Fig. 6, the magnet 33 is operated by impulses sent in either direction on the lines 54 and 55. The particular unit in circuit is of course chosen by the commutator switch 56 operated in any desired manner. It will be seen that the circuit is completed between the brushes 57 and 58 and the contact plate 59, the two former being mounted upon the frame 27 of the unit and insulated therefrom, the latter being carried by the drum 13 (see Fig. 1).

In Fig. 6 the reversing switch controlled by the pin 47 for reversing the motor, described with reference to the contacts 48 to 51 is designated by the reference numeral 60.

When all the selectors have been set, current is sent to the lines 61 and 55. This causes a motor starter 62 to bring the contacts 63 and 64 together thus throwing the motor 14 into circuit of the local power 65. The motor commences to rotate, the direction being controlled by the position of the selector wheel 31 that is, it depends upon whether the said wheel has been moved in such a direction as to cause the pin 47 to come above or below the flange 45.

Referring now to the mechanism shown at Fig. 5, 66 is a shaft, which is either a portion of the motor shaft or a shaft suitably geared thereto. This shaft has loosely mounted thereon a sleeve 67, provided with an inclined slot 68 into which projects a pin 69 fixed to the shaft 66. 70 is a grooved collar formed in one with the sleeve 67. It will be understood that when the shaft 66 is driven in the direction of the arrow 71, the pin 69 will cause the sleeve 67 to move to the left and to occupy the position in which it is shown at Fig. 5, while when the shaft rotates in the opposite direction, the sleeve is moved to the right. The movement of the sleeve controls the operation of a reversing switch 72, which is so connected to the circuit that when current of one polarity has been sent to the magnet 33, upon the subsequent starting of the motor the sleeve 67 is so moved as to cause the switch 72 to take up such a position that current flows from the local source 65 through the magnet 33 in the opposite direction to that of the impulses which set the wheel 31.

The circuit for this connection is as follows:—

Starting from the negative side of the source of power 65, the circuit can be followed to one arm of the switch 72. It passes thence to the line 55, then through the polarized magnet 33 to the brush 57, through the contact 59 to the brush 58, back to the other arm of the switch 72 and thence back to the source of power. It will be understood that as the drum 13 rotates, this circuit is broken every time a plate 59 leaves the brushes 57 and 58, so that in this way a series of impulses is sent to the polarized magnet of opposite polarity to those previously sent, causing the wheel 31 to be set back step by step, until the cut away portion 46 allows the pin 47 to spring into it. This breaks the circuit of the motor, which consequently stops.

At Figs. 1 and 6, it will be seen that two plates 59 are provided 80° apart. This is necessitated by the fact that the indications on the band 11 are two to a single revolution of the drum 13. The band 11 has, therefore, been moved through a number of indications corresponding to the number of impulses sent to the selector wheel 31. When the motor stops, the shaft 66 ceases to rotate, and the governor 73 mounted thereon causes the movable plate 74 in connection therewith to move toward the right. This allows the spring arm 75 to break contact with the screw 76, thus breaking the circuit of the reversing switch 72 across the lines 54 and 55. This is necessary to prevent a shunt across the said lines when fresh impulses are sent from the transmitting station to the polarized magnet 33.

Although the selector has been shown actuated by a polarized magnet, it is obvious that I may use two ordinary magnets for controlling the selector and separate contacts for each on the drum, which only make contact in one direction. Either magnet would be operated according to the direction in which the drum traveled.

Figure 8:
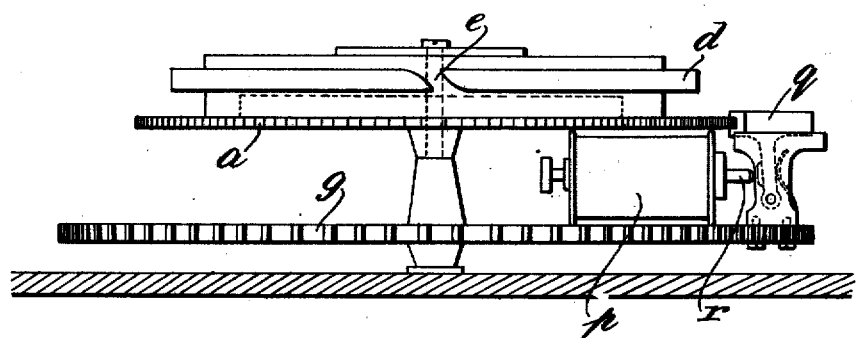
Fig. 8 shows in side elevation and Fig. 9 in plan another form of selecting mechanism.
Figure 9:
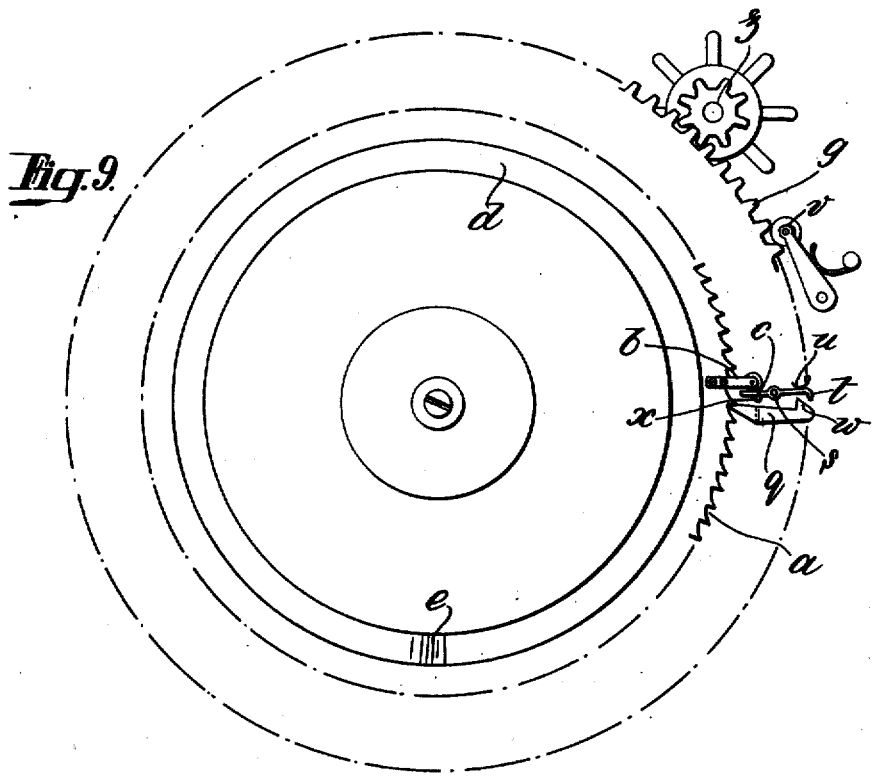

Referring now to Figs. 8 and 9, which illustrate another form of selecting mechanism, the great advantage of this form lies in the fact that a standard number of impulses have always to be sent to the exhibiting station for any particular indication, so that the operator where hand setting is employed does not have to take into consideration the previous setting.

In the drawing, $a$ shows the selector wheel, the magnet for operating which is not shown, but which always sets it in a counter-clockwise direction against the action of a spring contained in a spring barrel at the base of a wheel in connection with a flange $d$, similar in all respects to the wheel 44 and the flange 45. This wheel is carried by the selector wheel $a$, and moves freely around a pivot projecting from a counting wheel $g$. $p$ is a magnet carried by the counting wheel $g$, and $q$ is a spring catch normally engaging with the teeth of the selector wheel $a$, without however preventing it being moved by its actuating magnet. The catch $q$ is pivoted in guide brackets carried by the wheel $g$.

When the magnet $p$ is energized, the stem $r$ forces the catch $q$ out of engagement with the wheel $a$ and allows the said wheel to spring back until the projecting pin or roller $b$ comes into contact with a stop $c$ constituted by one arm of a lever $s$ pivoted upon a pin attached to the wheel $g$. The other arm of the lever $s$ is provided with a hook at $t$ and is kept pressed downward by a spring $u$, so that when the catch $q$ is forced from engagement with the teeth of the wheel $a$, the hook $t$ takes behind the nose $w$ on the catch $q$, thus holding the said catch out of engagement with the wheel $a$, until the projection $b$ comes around in a clockwise direction, into forcible contact with the stop $c$, knocking the hook $t$ out of engagement and allowing the catch $q$ to again swing inward. $x$ is a pin for limiting the movement of the stop $c$. $e$ indicates the neutral position on the flange $d$.

It should here be observed that when the selector wheel $a$ is set forward, that is, moved in a counterclockwise direction, by its electromagnet receiving a certain number of electrical impulses, the said wheel alone rotates, the wheel $g$ being prevented from rotating by means of a spring pressed detent $v$ or by its engagement with the gear wheel $z$. The wheel $g$ is only moved in either direction by means of the gear $z$ rotating in synchronism with the drum 13, but at the same time when the wheel $g$ rotates in either direction, it carries around with it the selector wheel $a$ and flange $d$ which may be described as a double cam. The selector wheel is allowed to move, since its actuating pawl when not working is out of engagement with the teeth.

The action of this form of the selector will now be described with reference to the diagrammatic representations thereof shown at Figs. 10 to 17 which show the form of selector described in detail with reference to Figs. 8 and 9, in different positions.

In these figures, $a$ shows the selector wheel, $b$ a pin projecting therefrom, $d$ a double faced cam controlling, by the direction of its rotation, the position of the switch arm $f$. $e$ indicates the neutral position. The cam $d$ is attached to the selector wheel $a$ and moves therewith. $g$ shows the counting wheel, which is moved through one step every time the band in the particular unit to which it is connected moves through the distance between one indication and the next consecutive one. The wheel $g$ carries a stop $c$ against which the projection $b$ is adapted to take. $k$ is an arrow which indicates on the counting wheel $g$ the particular indication being shown in the exhibiting unit. $h$ is the zero position.

It will be understood that the selector wheel $a$ is set forward, that is, it is moved in a counter clockwise direction by a suitable electromagnet through a number of steps corresponding to the number of impulses sent to the particular unit to which it is connected.

Figure 2:
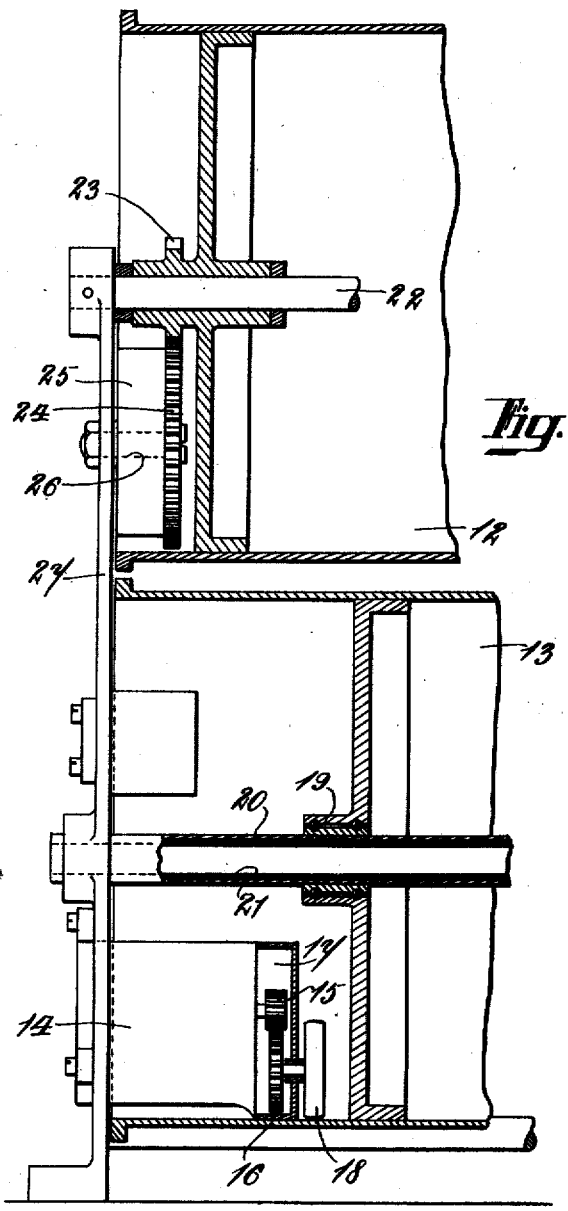
Fig. 2 shows a sectional rear elevation of a portion of Fig. 1.

The position of the parts in the zero position, that is in the position in which no indication is being exhibited, is shown in Fig. 10, where it will be seen that the projection $b$ is in contact with the stop $c$ and the switch arm $f$ at the zero position of the cam $d$. In this position, the motor to which the switch controlled by the arm $f$ is connected, similar to that shown at Figs. 1 and 2, is out of circuit. The arrow $k$ also indicates zero on the wheel $g$.

Supposing it is desired to set in the unit the indication corresponding to five impulses, these impulses are sent to the electromagnet controlling the selector wheel $a$, which is moved into the position shown at Fig. 11; it also causes the cam $d$ to move through five units of distance, removing the neutral position $e$ a similar distance from the arm $f$, which arm is consequently forced to the under side of the cam $d$ and this sets the motor driving the unit, so that when the motor is subsequently started the band roller causes the counting wheel $g$ to move in the direction of the arrow $m$ through the gear $z$ (Fig. 9). It will also be observed that the pin $b$ has moved through five units of distance from the stop $c$, it being remembered that the wheel $g$ is only moved by the moving part carrying the indication, such for example as the band drum, and not by the selector, and, therefore, remains at rest.

When the driving motor is started, the counter wheel $g$, the selector $a$ and the cam $d$ $d$ are turned back as a whole, that is moved in a clockwise direction. When five units of distance have been turned back, the neutral position $e$ comes opposite the arm $f$ which consequently breaks the circuit of the driving motor, which then stops, the parts remaining in the position shown at Fig. 12. It will be seen from this figure that the arrow $k$ indicates the fifth position and therefore the fifth, or in other words the desired indication is being exhibited in the unit.

Before sending fresh impulses to the unit the selector is allowed to spring back bringing the pin $b$ in contact with the stop $c$ (in the manner previously explained). This brings the position of the parts to that shown in Fig. 13. The neutral position $e$ is displaced five units of distance in Fig. 13, but this does not cause the motor to start owing to the fact that the circuit is broken in other positions, as will be readily understood.

Now when it is desired to set the band into a fresh position it is not necessary to first set it back to zero and then forward to the new position but it is only necessary to move the band through the difference in the two settings.

This is done in the following way:—

Taking the first case in which the number of impulses of the second setting is greater than those of the first setting, say for example in the case under consideration eight impulses are to be sent. The selector wheel $a$ and cam $d$ are set forward (counter-clockwise) by these impulses and take up the position shown at Fig. 14, the neutral position $e$ coming three units of distance to the other side of the arm $f$ and the pin $b$ eight units of distance from the stop $c$. When the motor is started by the other necessary contacts being made at the required time, the wheel $g$, selector wheel $a$ and cam $d$ are moved in the direction of the arrow $m$ as previously explained. When a movement of three units of distance has taken place, the neutral position $e$ comes opposite the arm $f$ and breaks the motor circuit stopping the motor and any further movement of the parts. The position the parts have taken up is shown at Fig. 15 where the arrow $k$ indicates eight, showing that the eighth indication is being exhibited.

The pin $b$ and stop $c$ are however eight units of distance apart and at the required time the pin is caused to spring around under the action of the spring in the spring barrel of the wheel $a$, and to come into contact with the stop $c$.

Returning to the position shown at Fig. 13 and considering the case where the number of impulses for the fresh setting is less than five say for example let two impulses be the number under consideration, when these impulses have been sent, the neutral position $e$ is three units of distance from the arm $f$ and on the same side thereof as in Fig. 13. The pin $b$ is two units of distance from the stop $c$, see Fig. 16. When the driving motor is started it will run in the opposite direction to that in the case previously under consideration, as it will be seen that the arm $f$ is on the opposite side, that is the upper side of the cam $d$ to that, say for example shown at Fig. 11, this as previously explained reverses some of the windings of the motor, through the reversing switch and consequently when the motor is started effects the reverse drive. The counting wheel $g$, selecting wheel $a$ and the cam $d$ therefore rotate in the direction of the arrow $n$ (reverse to arrow $m$) until after moving through three units of distance the neutral position $e$ comes opposite the arm $f$ and stops the motor. The parts are now in the position shown in Fig. 17 where the arrow $k$ indicates two, showing that the band is exhibiting the second indication. The pin $b$ is also two divisions from the stop $c$ and is caused, at the desired time, to spring into contact with the stop.

It should be observed from the diagrams (Figs. 12, 15, 17) that when the band is exhibiting the required indication or the like the pin $b$ occupies the position it occupied in Fig. 10 and also in these figures (12, 15 and 17) the pin $b$ is the same number of divisions from the stop $c$, as the number of impulses sent and consequently when the pin $b$ springs to the stop $c$, the neutral position $e$ is the same number of divisions or units of distance from the arm $f$ as impulses sent, see Fig. 13. It will also be understood that the next position after Figs. 15 and 17 will also fulfil this condition.

Referring now to the diagram of connections shown at Fig. 18, for use with the form of selector just described, when all the selectors have been set the arm 77 of the commutator switch for bringing the various units into circuit carries a contact 77ª for connecting the contacts 78 and 79. This brings a solenoid 80 into the circuit with a local supply, the circuit being completed through a contact 81 in electrical connection with an arm 82 pivoted at 83 which at this time occupies the dotted position. The core 84 of the solenoid 80 is connected to the arm 82 and consequently when the said solenoid is energized the arm is pulled over to the left (which is shown in Fig. 18 in full lines in the intermediate position). In the extreme position to the left it connects the two contacts 85 and 86 which bring the windings of the motors 14 into the supply circuit. The motors rotate in the direction according to where the switch arm $f$ has been located, the action of the said switch in this case reversing the flow through the armature windings. The movement of the band in a particular unit sets forward the counter wheel $g$ and when the neutral position $e$ is reached the motor stops and the desired indication is in position.

The position taken up by the selectors when the desired indication is in position is always the same as explained with reference to Figs. 12, 15, 17. This fact is taken advantage of by arranging contacts 87 upon the selectors (shown isolated in Fig. 18) which contacts are adapted to make electrical connection with brushes and in this way when all the selectors are in the desired position, a circuit is completed through the solenoid 89, the core 90 of which is also connected to the arm 82 completing the circuit between the contact 86 and the arm 82.

This brings back the arm 82 to the dotted position, shown at Fig. 18. In this last circuit a solenoid or magnet 91 is included which sets back the arm 77 through the medium of the spring $77^x$ which is put under tension when the arm 77 is moved forwardly from the first contact. During the forward movement of the arm the latter is kept from retracting by means of a ratchet wheel $77^y$ which is held by the pivoted pawl $91^x$ connected with the armature of the magnet 91. When however the magnet 91 is operated the ratchet is released and the arm 77 under the influence of the spring $77^x$ is set back. It will be understood that any suitable retracting means might be substituted in lieu of the means just described. When the arm 77 comes on to the first contact 92 a signal lamp not shown is lighted through a suitable circuit or over the lines 93 and 94 to indicate in the transmitting station the fact that all the indications are being exhibited.

Upon the first impulse being sent from the transmitting station for commencing a fresh series, the arm 77 makes electrical connection with a contact 95.

By this last contact the relay 96 comes into circuit and establishes a local circuit through all the release magnets $p$ (see Fig. 8) thus freeing the catches $q$ and allowing all the projections $b$ to come into contact with their stops $c$. When a fresh series of impulses is sent, the selectors are operated in a manner previously described with reference to Figs. 8 to 17.

Where alternating motors are employed, the governor mechanism may be used, so that the motor starts free and is subsequently coupled to the part to be moved by a clutch operated by the movement of the governor.

While I have described in general terms apparatus for the working of my invention, I do not confine myself necessarily to the mechanical construction or electrical details described, which may be modified to suit the requirements of various machines.

In some forms of my indicating devices I start or release the movements by a clockwork mechanism, which acts as a timing device.

In the above cases the counting wheel or selector is used to limit the movement of the indicating part and to bring about, electrically or mechanically, the reversal at the proper time. The movements may also be operated when found more convenient by means of contacts $11^b$ on the band $11^a$ which passes between the spring fingers $11^c$ as shown in Fig. 21, the fingers being adapted to be arranged in an electric circuit.

For instance, the movement of an ordinary clock may be caused to release by electrical or other means a band, every minute so as to bring the numeral or numerals for the next minute into position and at the end of each hour the band denoting the hour may be similarly operated, the reversing selector or other mechanism being adapted where required for bringing the bands back to zero.

What I claim as my invention and desire to secure by Letters Patent of the United States of America is:—

1. An advertising device, comprising a plurality of movable advertising members, a selector for determining the indication to be exhibited, and automatic means for causing the selector to determine the direction of movements of said members.

2. An advertising device, comprising a plurality of movable advertising members, a selector for determining the indication to be exhibited, automatic means for causing the selector to determine the direction of movement of the said members, and means whereby when the members are moved from exhibiting one indication to a new indication or setting, said members only move through a number of steps between the last setting and the new setting.

3. An advertising device, comprising a plurality of movable advertising members, a selector for determining the indication to be exhibited and automatic means for causing the selector to determine the direction of movement of the said member, said automatic means comprising an electric motor for operating the advertising member, and a switch for reversing the flow of the current in some of the windings of the motor and controlled by the direction of movement of the selector.

4. An advertising device, comprising a movable advertising member, a selector for controlling the movement of the said member, and means for setting back the selector in either direction in synchronism with the movements of the advertising member to the exhibiting position.

5. An advertising device, a movable advertising member, a selector wheel for controlling said movable member, a counting wheel upon which the selector wheel is loosely mounted, an operating magnet, means whereby the selector wheel can move forward under impulses sent thereto without moving the counting wheel, and means moving in synchronism with the movable member for moving the selector wheel backward by the counting wheel when the same is rotated.

6. In an advertising device, a toothed selector wheel, a counting wheel upon which the selector wheel is loosely mounted, a spring catch mounted on the counting wheel and engaging the teeth of the selector wheel, an electromagnet for forcing the catch out of engagement with the teeth of the selector wheel, a projection on the selector wheel, and a pivoted and spring pressed lever carried by the counting wheel, one end of the lever adapted to engage the spring catch to hold it out of engagement with the selector wheel and the other end adapted to be engaged by the projection of the selector wheel to release it from the spring catch.

7. An advertising device consisting of a frame, a plurality of movable display units carried by said frame and adapted to be brought into positions relative to each other for displaying a coherent announcement or indication, a selector for determining the particular indication to be displayed, and automatic means for controlling the selector.

8. An advertising device consisting of a frame, a plurality of movable display units carried by said frame and adapted to be brought into positions relative to each other for displaying a coherent announcement or indication, a selector, an electric motor for each unit and a switch for reversing the current in the motor, said switch being controlled by the direction of rotation of the selector.

9. An advertising device consisting of a frame, a plurality of movable display units carried by said frame and adapted to be brought into positions relative to each other for displaying a coherent announcement or indication, a selector, an electric motor for each unit, a switch for reversing the current in the motor, said switch being controlled by the direction of rotation of the selector, and means for setting the selector back in either direction synchronously with the movement of the units to their exhibiting positions.

In testimony whereof I affix my signature in presence of two witnesses.

HENRY KINGSFORD HARRIS.

Witnesses:
  A. E. VIDAL,
  H. D. JAMESON.